United States Patent
Asnaashari et al.

(10) Patent No.: US 9,792,047 B2
(45) Date of Patent: *Oct. 17, 2017

(54) STORAGE PROCESSOR MANAGING SOLID STATE DISK ARRAY

(71) Applicant: Avalanche Technology, Inc., Fremont, CA (US)

(72) Inventors: Mehdi Asnaashari, Danville, CA (US); Siamack Nemazie, Los Altos Hills, CA (US)

(73) Assignee: Avalanche Technology, Inc., Fremont, CA (US)

( * ) Notice: Subject to any disclaimer, the term of this patent is extended or adjusted under 35 U.S.C. 154(b) by 342 days.

This patent is subject to a terminal disclaimer.

(21) Appl. No.: 14/595,170

(22) Filed: Jan. 12, 2015

(65) Prior Publication Data
US 2015/0143038 A1 May 21, 2015

Related U.S. Application Data (63) Continuation of application No. 14/040,280, filed on Sep. 27, 2013, now Pat. No. 8,954,657.

(51) Int. Cl.
*G06F 3/06* (2006.01)
*G06F 12/02* (2006.01)

(52) U.S. Cl.
CPC ............ *G06F 3/061* (2013.01); *G06F 3/0659* (2013.01); *G06F 3/0688* (2013.01); *G06F 3/0689* (2013.01); *G06F 12/0246* (2013.01); *G06F 2212/7211* (2013.01)

(58) Field of Classification Search
CPC ...... G06F 3/061; G06F 3/0688; G06F 3/0689; G06F 3/0659; G06F 3/0611; G06F 3/0613; G06F 3/0619; G06F 12/0246; G06F 2212/7211; G06F 2212/7201; G06F 2212/7202; G06F 2212/7208
See application file for complete search history.

(56) References Cited

U.S. PATENT DOCUMENTS

| | | | |
|---|---|---|---|
| 2002/0091903 A1* | 7/2002 | Mizuno | G06F 3/0605 711/154 |
| 2008/0183947 A1* | 7/2008 | Shone | G06F 12/0246 711/103 |
| 2008/0256292 A1* | 10/2008 | Flynn | G06F 1/183 711/114 |
| 2008/0307192 A1* | 12/2008 | Sinclair | G06F 12/0246 711/218 |
| 2008/0320214 A1* | 12/2008 | Ma | G06F 3/0613 711/103 |
| 2010/0169542 A1* | 7/2010 | Sinclair | G06F 12/0246 711/103 |
| 2012/0059978 A1* | 3/2012 | Rosenband | G06F 3/0613 711/103 |
| 2012/0203993 A1* | 8/2012 | Virgin | G06F 12/0246 711/165 |

(Continued)

*Primary Examiner* — Michael Krofcheck
(74) *Attorney, Agent, or Firm* — Maryam Imam; Bing K. Yen (57) ABSTRACT

A method of writing to one or more solid state disks (SSDs) employed by a storage processor includes receiving a command, creating sub-commands from the command based on a granularity, and assigning the sub-commands to the SSDs independently of the command thereby causing striping across the SSDs.

1 Claim, 12 Drawing Sheets

(56) References Cited

U.S. PATENT DOCUMENTS

2012/0266050 A1* 10/2012 Cideciyan ............. H03M 13/05
714/773
2013/0198311 A1* 8/2013 Tamir .................... G06F 15/167
709/212

* cited by examiner

STORAGE PROCESSOR MANAGING SOLID STATE DISK ARRAY

CROSS REFERENCE TO RELATED APPLICATIONS

This application is a continuation of U.S. patent application Ser. No. 14/040,280, filed on Sep. 27, 2013, by Mehdi Asnaashari, and entitled "STORAGE PROCESSOR MANAGING SOLID STATE DISK ARRAY".

BACKGROUND OF THE INVENTION

Field of the Invention

This invention relates generally to solid state disks and particularly to addressing schemes used by solid state disks.

Description of the Prior Art

With the advent of the popularity of solid state drives (SSDs) and exponential growth of network content, the emergence of all-flash storage systems such as, SSD array, or storage appliances has been realized. These systems or appliances are either directly attached to a server via the Peripheral Component Interconnect Express (PCIe) or Serial Attached SCSI (SAS) or network attached via some high speed, high bandwidth network such as 10 Giga bit Ethernet (10 GbE). These storage units may include arrays of one or more SSD to meet requisite capacity and performance.

One of the problems facing the foregoing arrangement is a bottle neck created between the host and the storage units in that hosts may not utilize the array of SSDs evenly therefore not operating at their optimum performance. For general consumer applications, such as hand-held devices, this arrangement works well. However, in more sophisticated applications, such as Redundant Array of Independent Disks (RAID), employing numerous SSDs, performance of the system is clearly hindered.

Another problem with current techniques is wear leveling. As readily known to those in the art, the SSD is addressed by a host using logical block addresses (LBAs) and physical block addresses (PBAs). The LBAs are ultimately correlated with PBAs, the latter of which identifies a physical location within a SSD. To this end, if a series of locations identified by LBAs belonging to a particular set of SSDs in the array is written and then re-written and the remaining LBA-identified locations in the rest of the SSD is not as frequently written and re-written, the SSDs that are written and re-written experience more wear than those that are not written or less frequently written. Obviously, the latter scenario is undesirable.

Thus, there is a need for a high performance storage system with improved performance and wear leveling.

SUMMARY OF THE INVENTION

Briefly, a method includes writing to one or more solid state disks (SSDs) employed by a storage processor. The method includes receiving a command, creating sub-commands from the command based on a granularity, and assigning the sub-commands to the SSDs independently of the command thereby causing striping across the SSDs.

These and other objects and advantages of the invention will no doubt become apparent to those skilled in the art after having read the following detailed description of the various embodiments illustrated in the several figures of the drawing.

DETAILED DESCRIPTION OF THE VARIOUS EMBODIMENTS

In the following description of the embodiments, reference is made to the accompanying drawings that form a part hereof, and in which is shown by way of illustration of the specific embodiments in which the invention may be practiced. It is to be understood that other embodiments may be utilized because structural changes may be made without departing from the scope of the invention. It should be noted that the figures discussed herein are not drawn to scale and thicknesses of lines are not indicative of actual sizes.

An apparatus and/or method of the invention is disclosed herein for writing to one or more solid state disks (SSDs) employed by a storage processor. A command is received from a host by the storage processor and sub-commands are created from the command based on a granularity and the sub-commands are assigned to the SSDs independently of the command form the host thereby causing striping across the SSDs.

Figure 1:
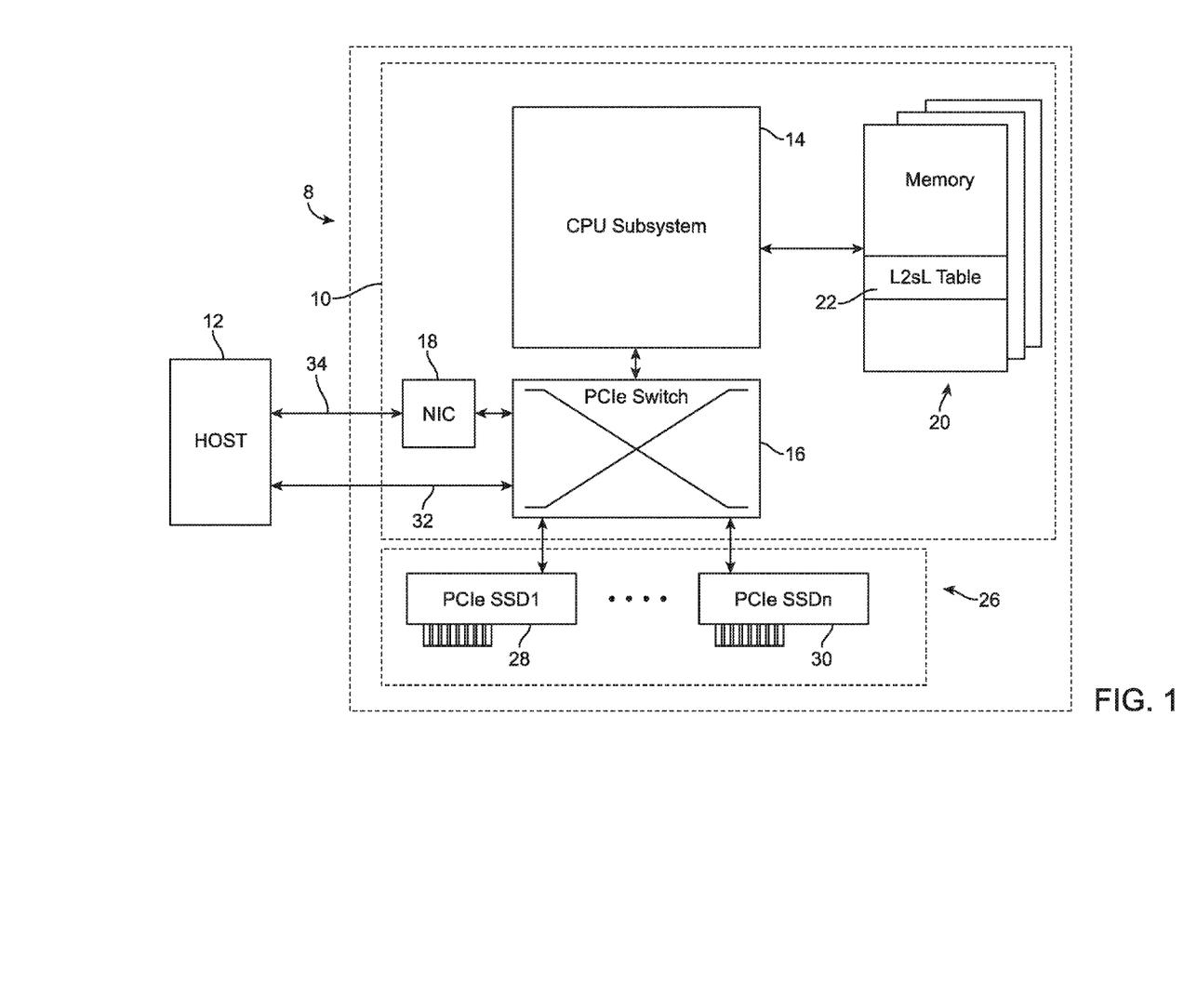
FIG. 1 shows a storage system 8 in accordance with an embodiment of the invention.

Referring now to FIG. 1, a storage system 8 is shown in accordance with an embodiment of the invention. The storage system 8 is shown to include storage processor 10 and a bank of solid state drives (SSDs) 26. The storage processor 10 is shown coupled to a host 12 and to a bank of Peripheral Component Interconnect Express (PCIe) solid state disks (SSDs) 26. The storage processor 10 is shown to include a CPU subsystem 14, a PCIe switch 16, a network interface card (NIC) 18, and memory 20. The memory 20 is shown to include logical-to-SSD logical (L2sL) table 22. The storage processor 10 is shown to also include an interface 34 and an interface 32.

The host 12 is shown coupled to the NIC 18 through the interface 34 and/or coupled to the PCIe switch 16 through the interface 32. The PCIe switch 16 is shown coupled to the bank of SSDs 26. The PCIe switch 16 is shown coupled to the bank of PCIe SSDs, which are shown to include PCIe SSD1 28 through PCIe SSDn 30 with the understanding that the bank of SSDs 26 may have additional SSDs than that which is shown in the embodiment of FIG. 1. The PCIe switch 16 is further shown coupled to the NIC 18 and the CPU subsystem 14. The CPU subsystem 14 is shown coupled to the memory 20. It is understood that the memory 20 may, and typically does, store additional information not depicted in FIG. 1.

In an embodiment of the invention, the memory 20 is volatile, such as dynamic random access memory (DRAM). In other embodiments, part or all of the memory 20 is non-volatile, such as flash, magnetic random access memory (MRAM), spin transfer torque magnetic random access memory (STTMRAM), resistive random access memory (RRAM), phase change memory (PCM) or other suitable memory types. In still other embodiments, the memory 20 is made of both volatile and non-volatile memory. It is desirable to save the table 22 in non-volatile memory so as to maintain the information that is saved therein even when power is not applied to the memory 20. As will be evident shortly, maintaining the information in memory at all times is of particular interest because the information maintained in the table 22 is key.

In an embodiment of the invention, the bank of SSDs 26 are PCIe SSDs. It is contemplated that other suitable types of SSDs, such as but not limited to, serial ATA (SATA) or serial-attached SCSI (SAS) in combination with port multiplier may be employed.

During operation, the host 12 issues a read or a write command along with data in the case of the latter. Information from the host is typically transferred between the host 12 and the processor 10 through the interfaces 32 and/or 34. That is, for example, through the interface 34, the NIC 18 transfers information between the processor 10 and the host 12 through the PCIe switch 16 and under the direction of the of the CPU subsystem 14. In the case where data is to be stored, i.e. a write operation is consummated, the CPU subsystem 14 receives the write command from the host and data to be stored through the PCIe switch 16 and the data is saved in the memory 20. The host's write command typically includes the starting LBA and number of LBAs (sector count) that the host intents to write. The starting LBA in combination with sector count is referred to herein as "host LBAs" or "host provided LBAs". Advantageously, the storage processor 10 or the CPU subsystem 14 maps the host LBAs to the SSDs in such a way that all SSDs are near evenly utilized.

Prior to the foregoing mapping by the CPU subsystem 14, the host write command is divided into or broken up in one or multiple write commands based on the number of LBAs that the host intents to write and further based on the granularity at which the logical-to-SSD logical table entries are maintained.

The host starting LBA and the sector count are used to divide the command into sub-commands with each sub-command making up at which the logical to SSD-logical table (L2sL) 22 entries are maintained. For example, a host write command with starting LBA of 24 and a sector count of 16 is divided into two write sub-commands; one write sub-command is the starting LBA of the 24 LBAs. Further, a sector count of 8 starting with the 32 LBAs is initiated by the storage processor. Hence the sector count of 8 is the granularity at which the L2sL table 22 entries are maintained. In this example, the starting LBA is also a multiple of 8, which matches the granularity of the L2sL table entries. Thus, mapping is done using divided or parsed LBAs.

In the case where the host provides a starting address and/or the sector count is not a multiple of the granularity of the L2sL table 22 entries, some of the write sub-commands are not the same as the granularity of LBAs that are covered by the L2sL entries. Those sub-commands have to be treated in a different manner. For example, host write command with a starting LBA of 26 and a sector count of 18 is divided into three sub-commands; first sub-command with a starting LBA of 26 and a sector count of 6, second sub-command with a starting LBA of 32 and a sector count of 8, and third sub-command with a starting address of 40 and a sector count of 4. Hence the first write sub-command and the third write sub-command's sector counts are each less than the granularity of the L2sL table 22 entries and will be treated in a different manner as described later.

Upon receiving a write command from the host, the command and data associated with the write command is saved in memory 20. The storage processor 10 breaks up the received command into multiple sub-commands based on a granularity that is typically, although not necessarily, the same as the granularity of the L2sL table 22 entries. The storage processor 10 or CPU subsystem 14 re-distribute the host logical block addresses (LBAs) across the bank of SSDs 26 in a manner so as to nearly guarantee even utilization of the bank of SSDs 26.

A command from the host 12, once received, is generally identified by LBAs, however, these LBAs are not used to directly access the data in the SSDs. Instead, SSD LBAs (SLBAs) are used when accessing the bank of SSDs 26. To prevent uneven use of one or more SSDs, host write commands are each divided into multiple sub-commands and mapped to an unassigned SLBA from each SSD therefore causing substantially even distribution of the sub-commands across the SSDs. Mapping of the LBAs to SLBAs is maintained in the L2sL table 22.

Distributing the random LBAs corresponding to a host write command across multiple SSDs decouples the host LBAs from their final destination, SLBAs, in the SSDs. Mapping of the host LBAs to unassigned SLBAs is done in a manner so as to nearly guarantee even utilization of the bank of SSDs 26. The assignment of the unassigned SLBAs to LBAs following host write commands starts where the previous assignment stopped. The L2sL table 22 maintains the relationship between the host LBAs and the SSD LBAs. More specifically, the table 22 includes logical-to-SSD logical addresses as will be discussed in further detail below. Accordingly, the host is ignorant of SSD LBA assignments and sub-commands are assigned to a different SSD independently of the host.

Ideally, the granularity of the SLBAs matches the granularity of the table 22 entries.

Figure 2:
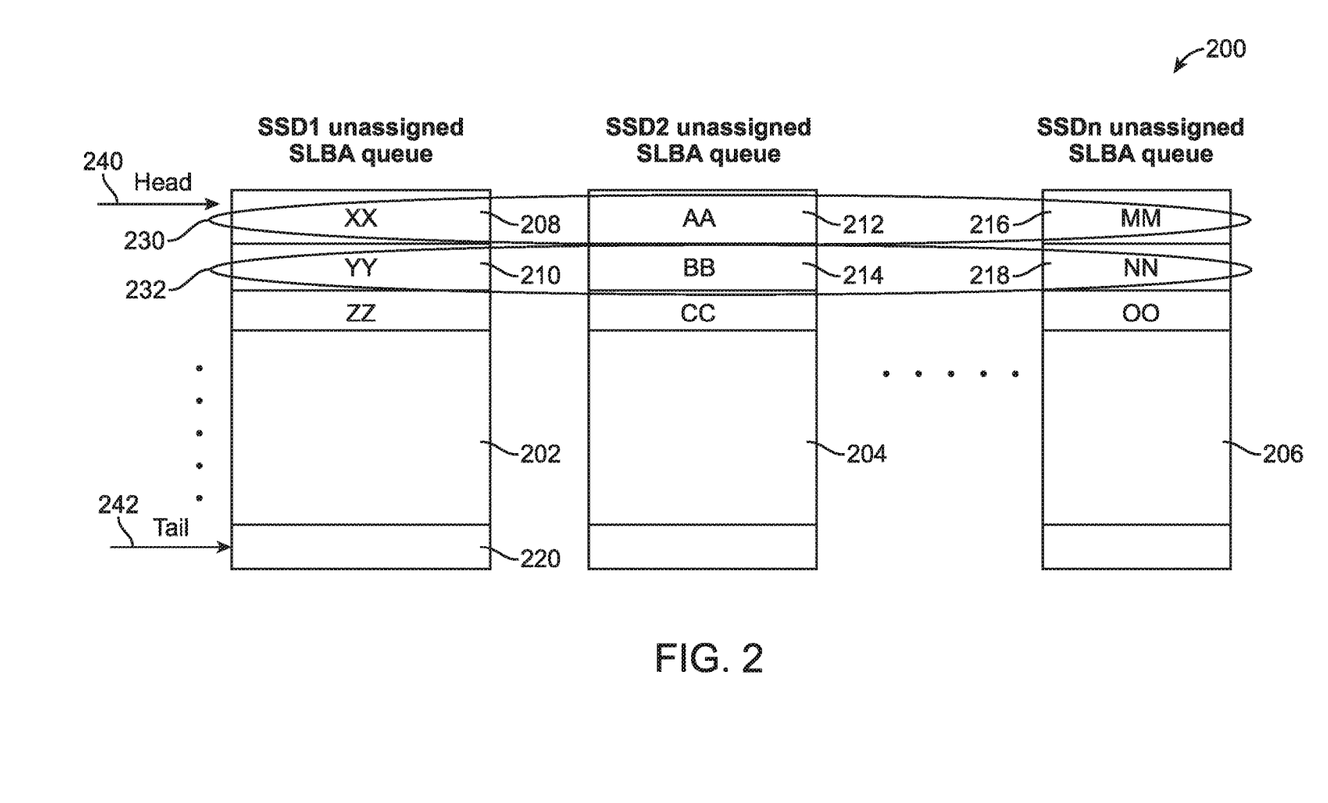
FIG. 2 shows an example of initial mapping unassigned SSD LBA (SLBA) queues used by the storage processor 10 for assignment of LBAs to SLBAs, in accordance with an exemplary embodiment of the invention.

FIG. 2 shows an example of an organization 200 of the information that CPU subsystem 14 uses to map a random host LBA to one or more SSD LBAs in accordance with an exemplary embodiment of the invention. This information is shown to be organized into queues, in the embodiment of FIG. 2, with each queue shown assigned to a particular SSD. Entries of unassigned SLBA queues 202, 204, and 206 are SSD LBA, also referred to herein as "SLBA", and are used by the storage processor 10 or CPU subsystem 14 to map host-provided LBAs. "Host-provided LBAs" and "host LBAs" are used synonymously herein.

The entries in the queues 202, 204, and 206 in the example of FIG. 2 are the initial values when none of the SSD LBAs have been assigned to any of the host LBAs.

In an embodiment of the invention, the queues 202, 204, and 206 are each a circular buffer and include a head pointer and a tail pointer. For instance, queue 202 has a head pointer 240 pointing to SSD LBA 208 and a tail pointer 242 pointing to the SSD LBA 220. The head pointer 240 points to the value, in the SSD LBA 208, that should be used by the CPU subsystem 14 to assign the next host LBA for that particular SSD. The tail pointer 242 points to the last valid (not old) value in the queue. Accordingly, in the case where, for example, the head pointer 240 points to the same location as the tail pointer 242, there are no valid SLBAs left in the queue.

In embodiments of the invention, the host LBAs of a commands are divided into sub-commands and dynamically assigned to SLBAs of the bank of SSDs rather than permanently or statically assignment, as done by prior art techniques.

Initially, all of the SLBA entries in the queue are available for assignment with the head pointer pointing to the top of the circular queue (or "circular buffer") and the tail pointer pointing to the end of the circular buffer. For example, the top of the circular buffer 202 is the head pointer 240 pointing to the location 208 and at the bottom of the circular buffer 202 is the tail pointer 242 pointing to the end or bottom of the circular buffer 202, at the location 220. As the CPU subsystem 14 assigns SSD LBAs to the host LBAs, the head pointer of a SSD queue moves down to the next unassigned SSD LBA. And as an already assigned SSD LBA becomes invalid (or un-assigned), it is added to the same SSD queue pointed to by the tail pointer plus one. Each of the queues of FIG. 2, i.e. 202-206, are associated with a distinct PCIe SSD. For example, the SSD 28 of FIG. 1 may be assigned to the queue 202 of FIG. 2 and so on.

In one embodiment of the invention, the head pointer entries across the bank of SSDs 26 create a stripe of unassigned SLBAs 230 as shown in FIG. 2. The storage processor 10 or CPU subsystem 14 use all of the unassigned SLBAs within a stripe prior to advancing to the next stripe hence assigning one SSD LBA entry from each SSD to a host sub-command LBA. For instance, CPU subsystem 14 uses: the entries "XX" in the location 208 of the queue 202; "AA" in the location 212 of the queue 204; and "MM" in the location 216 in the queue 216. The CPU subsystem 14 uses this information, to form the stripe 230 before creating a next stripe 232 and using the next set of unassigned SLBAs, i.e. "YY" 210, and "BB" 214 through "NN" 218.

It is understood that while three queues are shown in the example of FIG. 2, a different number of queues is contemplated with generally the number of queues being dictated by the number of PCIe SSDs being employed.

The foregoing host LBA manipulation has a number of benefits, one of which is wear leveling by having the random LBAs from the host mapped to SLBAs that are substantially evenly spread across the bank of SSDs 26. Another benefit is increased performance. Regarding the latter, because the host LBAs are evenly spread across all SSDs, they are evenly employed therefore alleviating scenarios where a small set of SSDs rather than all SSDs within the bank of SSDs are utilized, such as in the case of the host commands targeting a small set of SSDs. By employing all SSDs substantially evenly, bottleneck is avoided and performance is increased.

Figure 3:
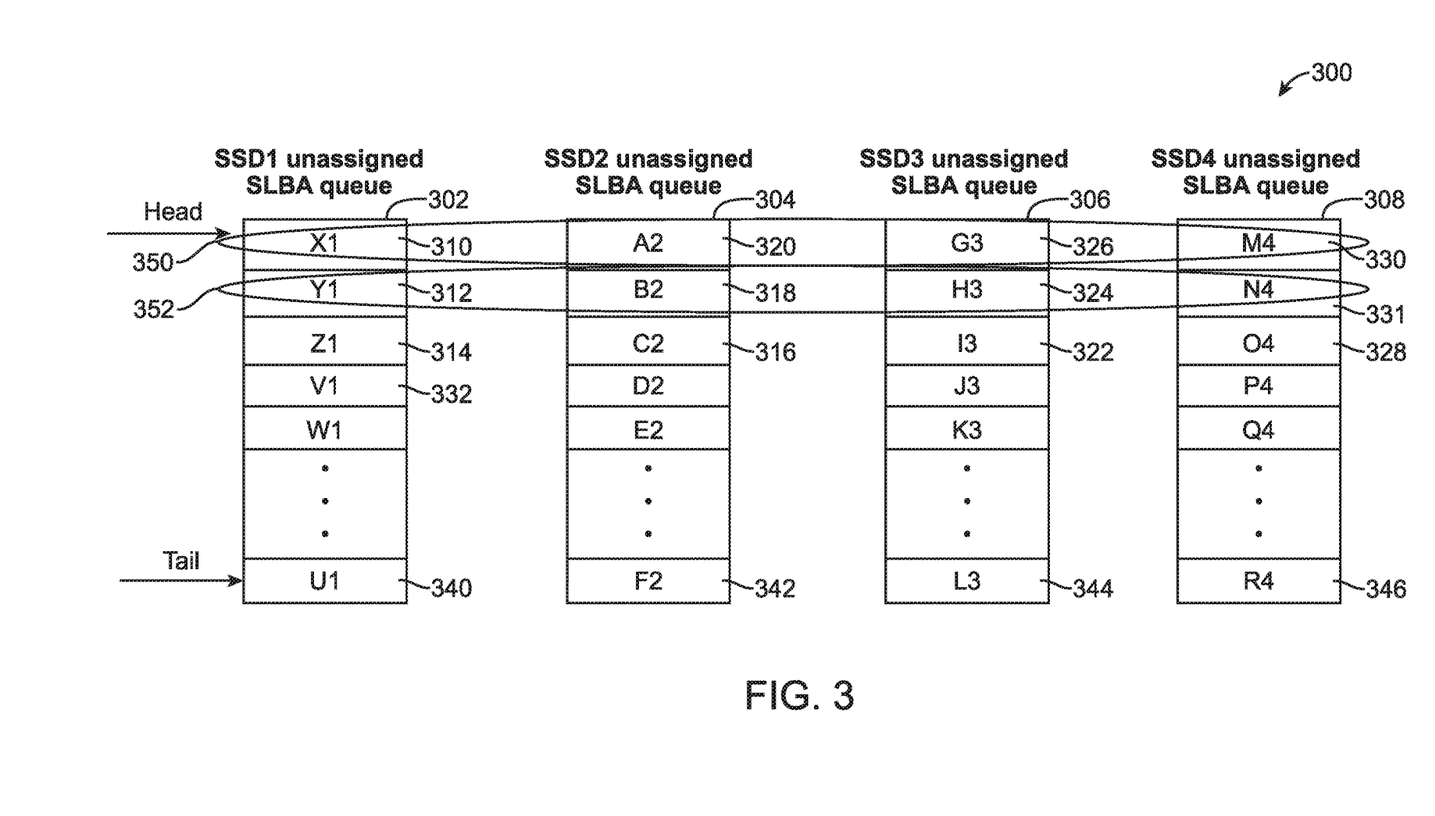
FIG. 3 shows s specific implementation of the example of the FIG. 2 showing four unassigned SLBA queues 302-308, with each queue being assigned to a distinct SSD.

For a better understanding of the tables of FIG. 2, an example is shown in subsequent figures. FIG. 3 shows an exemplary organization 300 of the information that CPU subsystem 14 uses to map a host LBA to a particular SSD LBA, in accordance with an exemplary embodiment of the invention. In the embodiment of FIG. 3, four queues, queues (or "tables") 302-308, are depicted with each queue being assigned to a distinct SSD. For example, table 302 is assigned to SSD1, table 304 is assigned to SSD2, table 306 is associated to SSD3 and table 308 is associated to SSD4. It is understood that while four tables are shown in FIG. 3, any number of queues and SSDs may be employed.

Further, in the example of FIG. 3, the granularity of the L2sL table 22 entries is 8 LBAs, which is equal to the size of a flash page.

Each of the queues 302-308 holds unassigned SLBAs for a particular SSD among the bank of PCIe SSD 26. Unassigned SLBAs are those SSD LBAs that have yet to be assigned to a host LBA.

In one embodiment of the invention, the CPU subsystem 14 maintains these queues. In another embodiment, these queues are maintained in the memory 20.

In the above example, queue 302 is shown to have unassigned LBAs 310, 312, 314, and 340 for SSD1. The storage processor 10 or CPU subsystem 14 maintain the L2sL table 22 which holds the assignment relationship between the host LBAs and the SSD LBAs (SLBA). This mapping remains invisible to the host 12 and is used to assure even utilization of the bank of PCIe SSDs 26. In other embodiment of the invention, dedicated hardware may maintain these queues or table.

In the example of FIGS. 2 and 3, 'n' represents the number of SSDs, "X" represents the granularity of the LBAs and SLBAs that are maintained in the L2sL table 22 and the SSD queues which also represents the granularity at which host commands are striped across a bank of SSDs 26. "Y" represents a number of LBAs in a page of flash memory, which in this example is equal to the granularity of the LBAs maintained in L2sL table 22. In other examples, as shown and discussed with reference to subsequent figures herein, X and Y may be different.

Queues 302, 304, 306 and 308 include the SSD LBAs that have not yet been assigned to the host LBAs. Entries X1 310, Y1 312, Z1 314, and U1 340, in the queue 302, are the LBAs in SSD1 that have not yet been assigned. Similarly, SLBAs entries A2 320, B2 318, C2 316, and D2 342, in the queue 304, are the LBAs in SSD2. SLBAs entries G3 326, H3 324, I3 322 and J3 344, in the queue 306, are the LBAs in SSD3, and SLBAs entries M4 330, N4 331, O4 328, and P4 346, in the queue 308, are the LBAs in SSD4 that have not yet been assigned to any host LBAs.

The head of the queues 302, 304, 306, and 308 in SSD1, SSD2. SSD3, and SSD4, respectively, make up the stripe 350. The CPU subsystem 14 uses the SLBAs entries X1 310, A2 320, G3 326, and M4 330 to assign the same to host LBAs. Once all the entries in the stripe 350 are exhausted, a new stripe 352 is formed with SLBAs entries Y1 312, B2 318, H3 324, and N4 331.

In accordance with an embodiment and method of the invention, the storage processor 10 or CPU subsystem 14 assigns SLBAs from each SSD to random host LBAs in a round robin manner to ensure that all four SSDs are used substantially evenly thereby preventing wear of one or more SSDs. This is due in large part to no one SSD being used substantially more than other SSDs. The SLBAs are assigned across the bank of SSDs to host LBAs (also referred to as "striping") rather than pre-assigning of host LBAs to a bank of SSDs, as done in prior art techniques. Stated differently, SLBAs are striped across all four SSDs before another striping is performed. In addition to addressing wear leveling, embodiments and methods of the invention cause an increase in the performance of the storage processor by allowing parallel or simultaneous access of the SSDs.

The queues 302-308 are generally saved in the memory 20, shown in FIG. 1.

It is understood that other schemes beside the queuing scheme shown and discussed herein may be employed to maintain the unassigned SLBAs for the bank of SSD.

Figure 4:
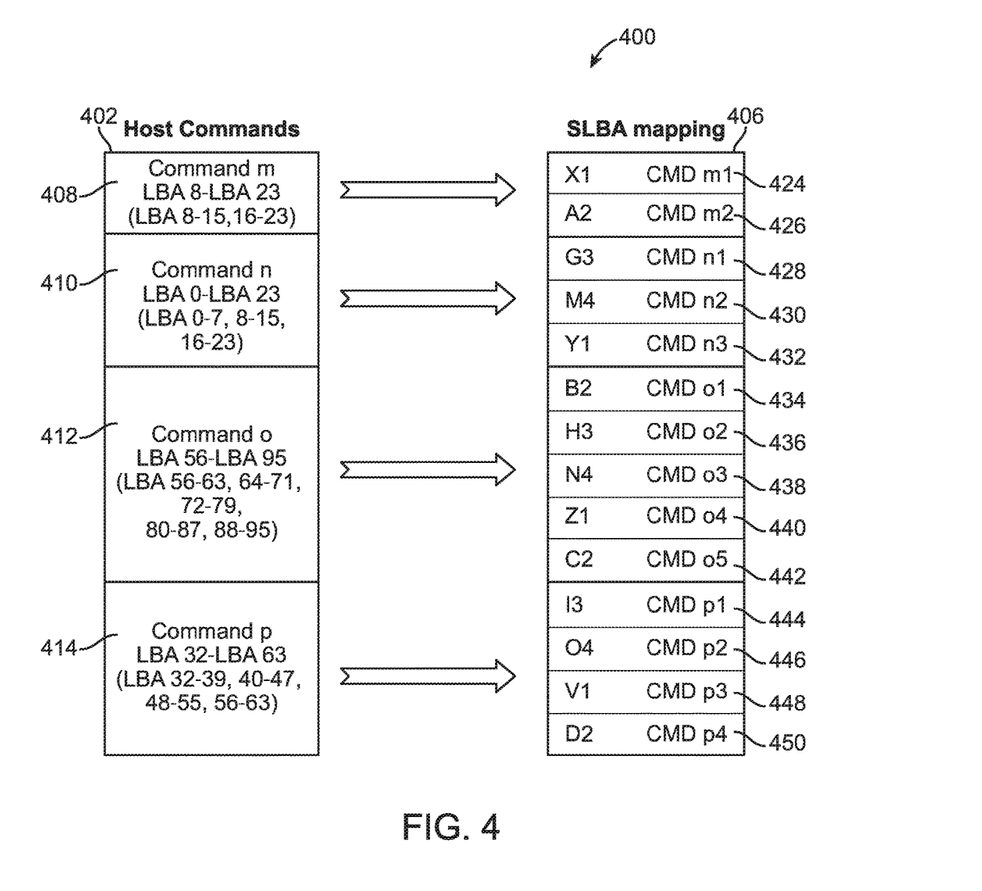
FIG. 4 shows further details of the example of FIG. 3 showing assignments of the host LBAs to SSD LBAs based on specific implementation of example of FIG. 3.

FIG. 4 shows further details of the example of FIG. 3. More specifically, the L2sL table 406 using the example of FIG. 3 is presented. An organization 400 of two tables, tables 402 and 406, is shown. The host write command table 402 is a table of write commands received from the host by the storage processor 10 (of FIG. 1) and their associated LBAs. Table 406 illustrates an example of how the host write commands are divided into sub-commands and striped across the bank of SSDs 26 and how they are mapped to the unassigned SSD LBAs of FIG. 3.

The host commands "m", "n", "o", and "p", each have associated therewith host LBAs. Write commands are initially striped or divided into one or a number of sub-commands at a granularity of the L2sL table entries, i.e. entries in the tables of FIG. 3. Command m is associated with 16 LBAs, i.e. LBAs 8-23. Because SLBAs are maintained at granularity of 8 in a given location within the SLBA table 406, the host LBAs associated with the write command 'm' are divided into two sub-commands 'm1' and 'm2' and striped across two SSDs, SSD1 and SSD2. Write command 'n' uses 24 LBAs, which are divided into three sub-commands 'n1', 'n2', and 'n3' and striped across 3 SSDs; SSD3, SSD4, and SSD1. The sub-commands m1 and m2 are then mapped to unassigned SLBAs X1 and A2 from the stripe 350 of FIG. 3 and sub-commands n1, n2, and n3 are mapped to the next three unassigned SLBAs, two of which are from the stripe 350, i.e. G3 and M4. Once all the entries of the stripe 350 are exhausted and assigned to host LBAs, the next stripe, stripe 352 of FIG. 3, is formed from the head pointers, and sub-command n3 is mapped to the entry Y1. It is worthy to note that some of the host LBAs overlap when the host accesses the same location more than once. For example, command m includes the associated LBA 8-LBA 23 and this same LBA range is also associated with command n. The problem of overwriting is further discussed below.

In this example, a sequential type of algorithm is employed with the SLBAs being sequentially assigned to the host LBAs. However, CPU subsystem 14 or storage processor 10 may choose to employ another algorithm to assign the SLBAs to host LBAs. Also in this example, stripes are shown formed from head pointers of unassigned SLBAs queues and nicely aligned in rows to make the illustration simple. The CPU subsystem 14 or storage processor 10 may choose other algorithms for creating a stripe.

The table 406 is essentially a logical to logical mapping which maps host LBAs across bank of SSDs. It maps the host LBAs to SLBAs. For example, the host LBA 8-LBA 15 of write command m in the table 402 is mapped to SLBA X1 424 and the LBA 16-LBA 23 of the same command is mapped to SLBA A2 426.

Accordingly, unlike host LBAs, the SLBAs are sequentially and evenly assigned to the bank of SSDs thereby ensuring against uneven use of the SSDs.

Because each command can be divided into multiple parts, i.e. sub-commands, the table 406 is used to indicate the location of each sub-command within one or more SSDs. For example, the SLBA X1 address locations are within the SSD1 and the SLBA A2 address locations are within the SSD2. The SLBA G3, M4 and Y1 span across multiple SSDs, i.e. SSD3, SSD4, and SSD1, respectively. The X1 and A2 span across the SSD1 and SSD2.

Figure 5:
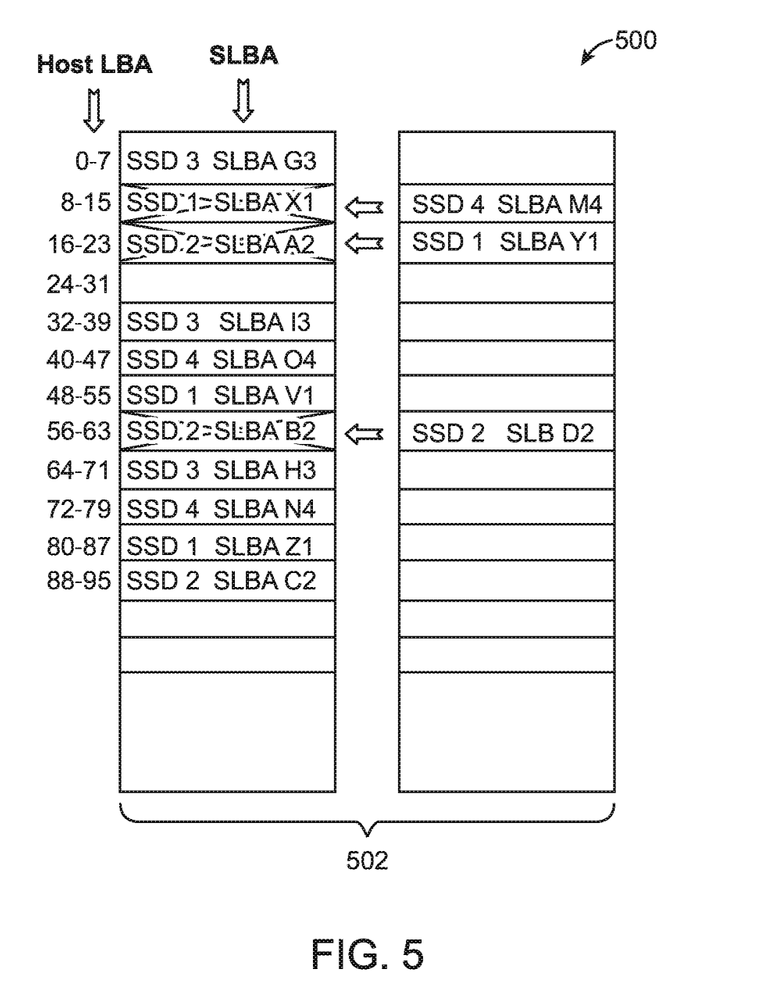
FIG. 5 shows an example of host logical to SSD logical address (L2sL) table on specific implementation of example of FIG. 4.

FIG. 5 show an example of the L2sL table. L2sL table 502, which is analogous to the table 22 of FIG. 1, is used to keep the mapping relationship of the host LBAs to the SSD LBAs. In one embodiment of the invention, CPU subsystem 14 maintains this relationship.

Referring still to FIG. 5, as previously discussed, command 'm' includes LBAs that are re-written by some of the LBAs of command 'n'. The re-written host LBAs are now associated with a new set of SLBAs that are different than that which is previously used. For example, the LBA 8-15, associated with the command 'm' is mapped to SLBA X1 and rather than causing a re-write of SLBA X1, it is written and points to SLBA M4, as shown in the table 502. Similarly, with regard to the same commands, host LBA 16-LBA 23 are re-written and therefore point to SLBA Y1 instead of SLBA A2. The L2sL table 502 points to the last SLBAs which is previously used to map host LBAs. The L2sL table 502 is updated with the most recent SLBAs assigned to the host LBA and renders the previous SLBAs in that location as old or unassigned. Unassigned SLBAs of this example such as X1, A2, and B2, are eventually reclaimed and added to the tail end of their respective unassigned SLBA queue.

Figure 6:
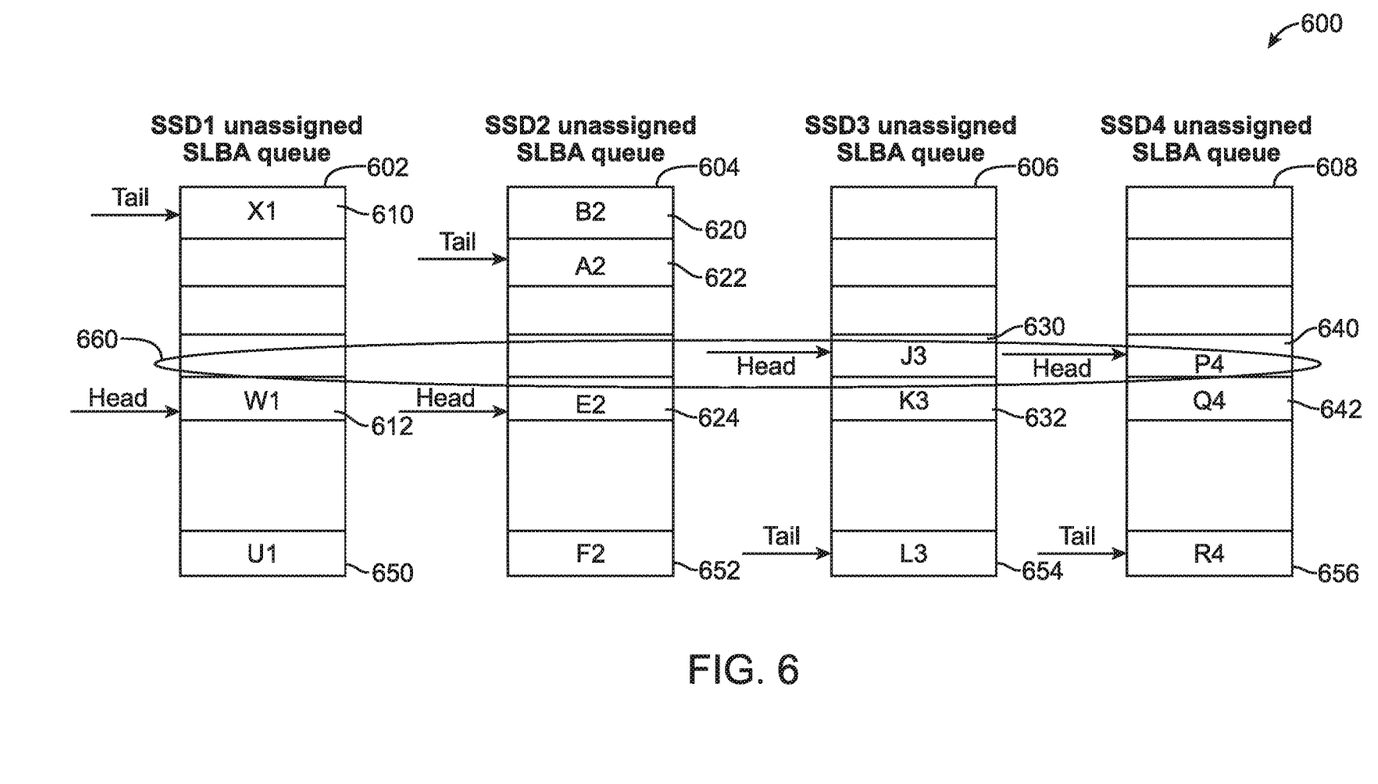
FIG. 6 shows an example of unassigned SLBA queues used by the CPU subsystem for assignment of LBAs to SLBAs after assignment of several LBAs to SLBAs in accordance to example 5.

FIG. 6 shows the SSD unassigned SLBA queues for the bank of 4 SSDs of the example of FIG. 3, FIG. 4, and FIG. 5. The head pointer and tail pointer of each queue has moved as the SLBAs are assigned to host LBAs and as old SLBAs are added back to their respective unassigned queues. For example, unassigned SLBA J3 630 in stripe 660 is used by the CPU subsystem 14 for mapping the next host LBA.

Referring still to FIG. 6, there might exist cases where a complete stripe across all SSDs cannot be formed because some SSDs within the bank may not have any unassigned SLBAs. In such cases a partial stripe is formed across a subset of SSDs, within the bank, and has one or more unassigned SLBA.

Figure 7:
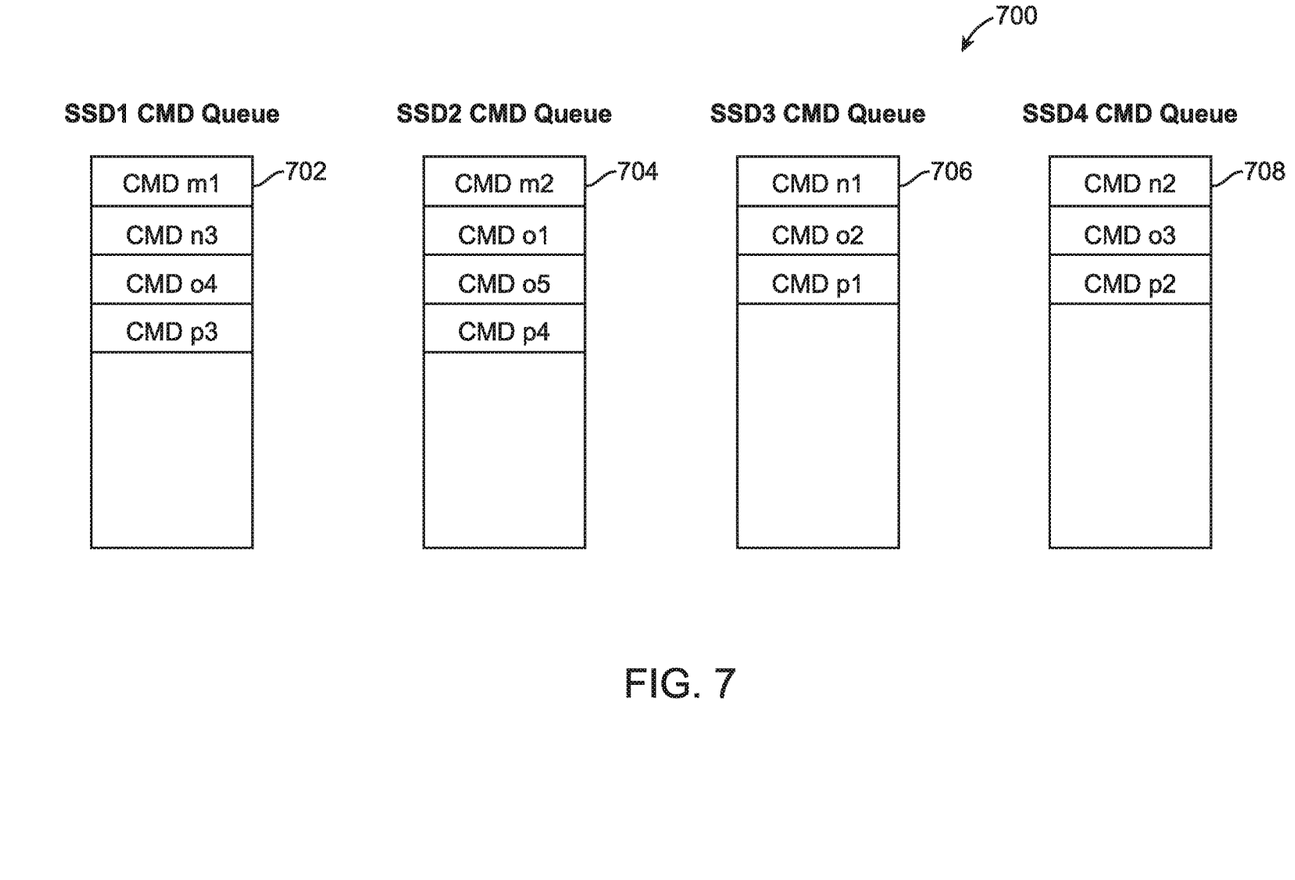
FIG. 7 shows a set of command queues 700 for correlating host write commands with SSDs using the example of FIG. 4.

FIG. 7 shows a set of tables 700 for correlating write commands with SSDs using the example of FIGS. 4 and 5. As shown in FIGS. 4 and 5, a write command is divided into sub-commands and striped across multiple SSDs based on the number of LBAs the command calls for and the granularity of the L2SL table entries. Thus, a command can span across multiple SSDs. As such, a single host write command may be divided into multiple sub-commands targeting multiple SSDs. For example, command 'm' is divided into sub-commands 'm1' and 'm2' targeting SSD1 and SSD2, respectively. As such, m1 and m2 are included in the command queues 702 and 704 of SSD1 and SSD2, respectively. Similarly, command 'n' has parts in SSD3, SSD4, and SSD1 and its sub-commands are added to command queues 706, 708, and 702, respectively.

In an embodiment of the invention, the tables 700 reside in the memory 20. In other embodiments, the tables 600 reside in any suitable location of FIG. 1.

In the event the received LBAs associated with a host command do not align with the granularity of the L2sL table entires, the storage processor 10 may perform one of a few options. One option is to wait until it receives the remainder of the LBAs to complete the granularity and then assign the complete host LBAs to a SLBA and dispatch the command. Another option is to issue a read command to a SSD that contains the host data associated with host LBAs to complete the granularity and then assign the LBAs to a new unassigned SLBA and dispatch the command. Yet another option is to have the storage processor 10 issue a partial write command to the same SLBA and SSD corresponding to the received host LBA and have the SSD to merge the partial SLBA data with the remainder of the data.

Figure 8:
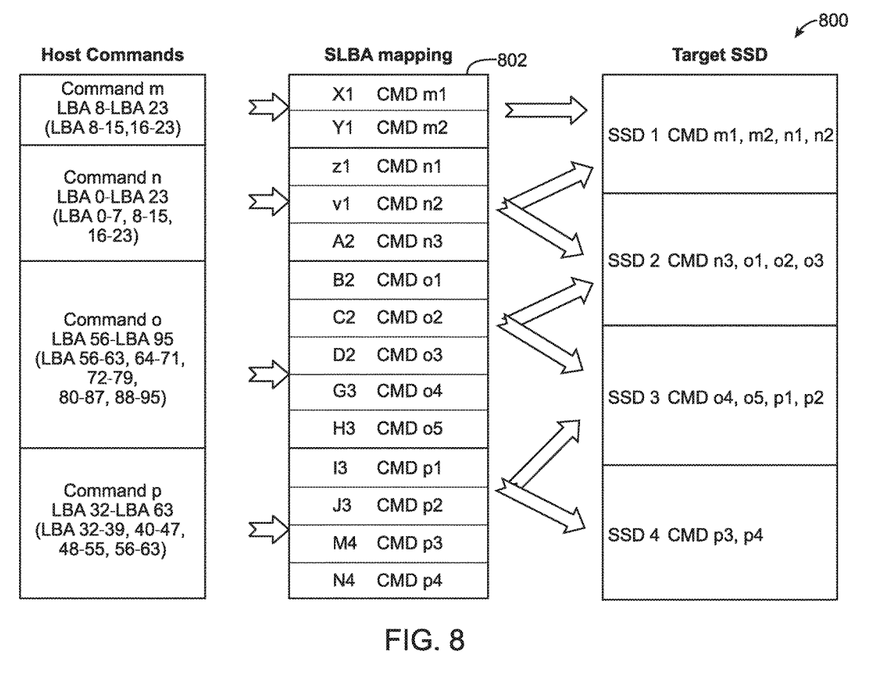
FIGS. 8-9 show another example of a method and apparatus for associating and saving host write commands in SSDs.
Figure 9:
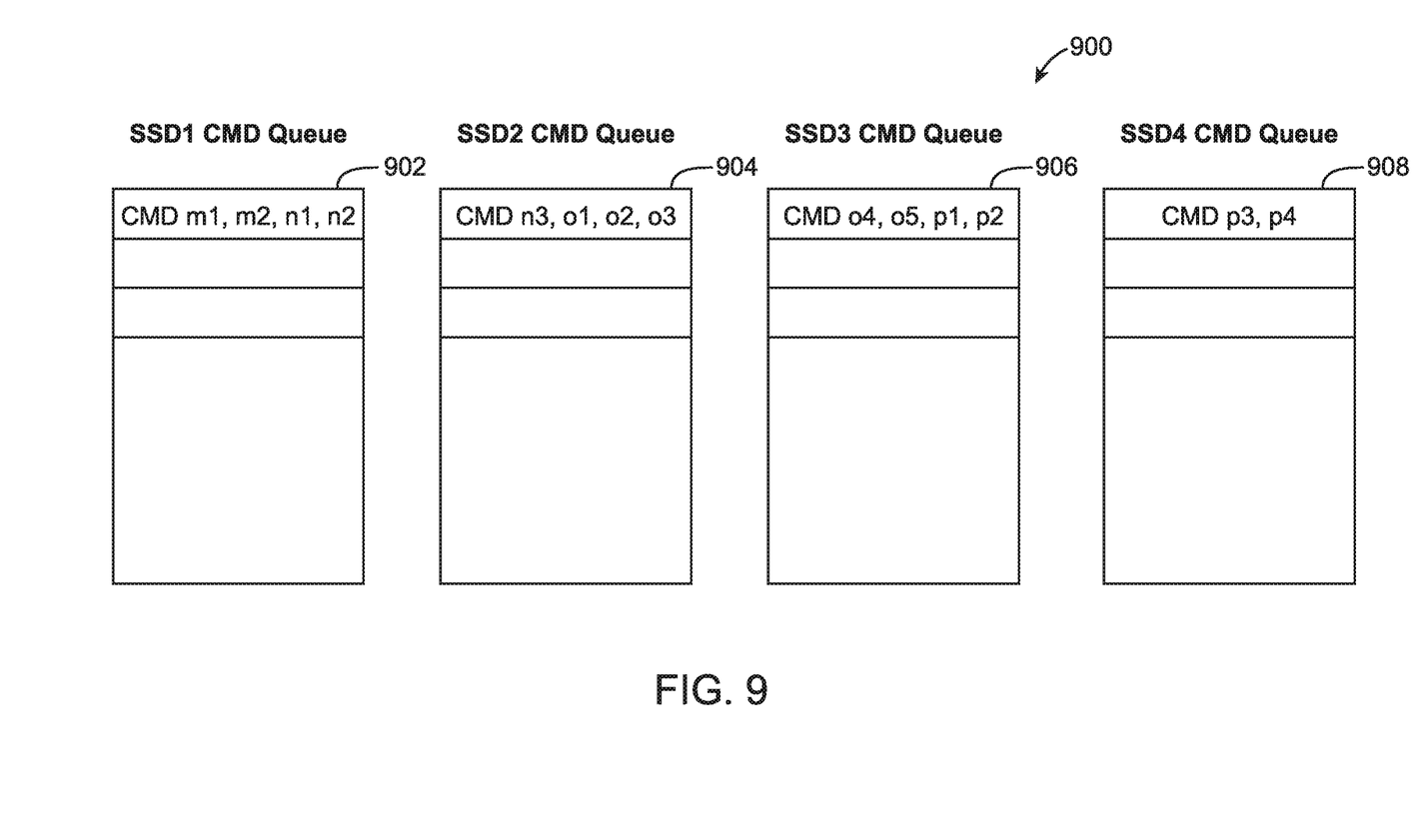

FIGS. 8-9 show another example of a method and apparatus for associating and saving commands in SSDs. In this example, the flash page size, Y, is 32 LBAs and the granularity of each of the entries in the L2sL table, X, is 8. Thus, the flash page size is four times greater than the each of the entries maintained in the L2sL table. To optimize the overall performance of the individual SSDs in the bank of PCIe SSDs 26, the storage processor 10 stores as many sub-commands in each of the SSD command queues as it takes to fill the entire flash page. Once enough sub-commands are queued for one SSD to fill its entire flash page, the CPU subsystem dispatches the sub-commands to the SSD and queues the subsequent sub-commands for the next SSD in the bank of PCIe SSDs 26.

In the foregoing example, 4 sub-commands are queued per SDD because the flash page size is 4 times greater than the L2sL entries. Since the four sub-commands are being queued for the same SSD, the four unassigned SLBAs, being assigned to the LBA, are drawn from the same unassigned SLBA queue, which corresponds to the SSD.

Referring now to the example on FIG. 8, table 802, and FIG. 3, unassigned SLBA tables 302, 304, 306 and 308, four SLBAs X1 310, Y1 312, Z1 314, and V1 332 from the SSD1 queue 302 are assigned to striped host LBAs before using SLBAs from the SSD2 queue 304. Once enough sub-commands are queued to fill a page of the flash memory in the SSD, all the sub-commands are dispatched to their respective SSD location at substantially the same time. In the SSD command queues (tables), as shown in FIG. 9, each of the SSD command queues 902, 904, and 906 have enough sub-commands to fill a flash page and are ready to be dispatched to the SSDs. However, the queue 908 does not have enough sub-commands to fill a page hence it is not dispatched.

In some embodiments of the invention, the storage processor 10 or CPU subsystem 14 may queue enough commands for each flash memory such that the flash memory can perform a program page multi-plane operation to further improve the performance of the SSDs and the storage system 8. In other embodiments of the invention, storage processor 10 queues and dispatches the SSD sub-commands based on its L2sL entry size regardless of the flash page size and allows the individual SSDs to perform the optimization.

In another embodiment of the invention, the unassigned queues and L2sL table are maintained in non-volatile portion of the memory 20. As such, these queues and table retain their values in the event of power failure. In another embodiment, the queues and/or table are maintained in a DRAM and periodically stored in the bank of SSDs 26.

In yet another embodiment of the invention, the host data associated with a host write command is stored in the non-volatile memory portion of the memory 20. In such a case, completion of the write command can be sent to the host once the data is in the memory 20 and prior to dispatching of the data to the bank of SSDs. This is due to the data being in a persistent memory hence the write latency being substantially reduced therefore allowing the host system to de-allocate resources that were dedicated to the write command.

In other embodiments of the invention, the storage processor 10 keeps track of a number of sub-commands corresponding to a host write command and only de-allocates the portion of the memory 20, and other resources associated with the write command, once all the sub-commands are successfully written to the bank of SSDs.

In another embodiment of the invention, the storage processor 10 keeps track of the number of sub-commands corresponding to a host read command and only transfers the data to the host once all the data associated with the sub-commands are successfully read and transferred to a portion of the memory 20.

In some embodiment of the invention, the storage processor 10 maintains an entry in a status queue corresponding to each entry of the SSD command queue to keep track of sub-command completion. It is understood that a command can be made of only one sub-command.

Figure 10A:
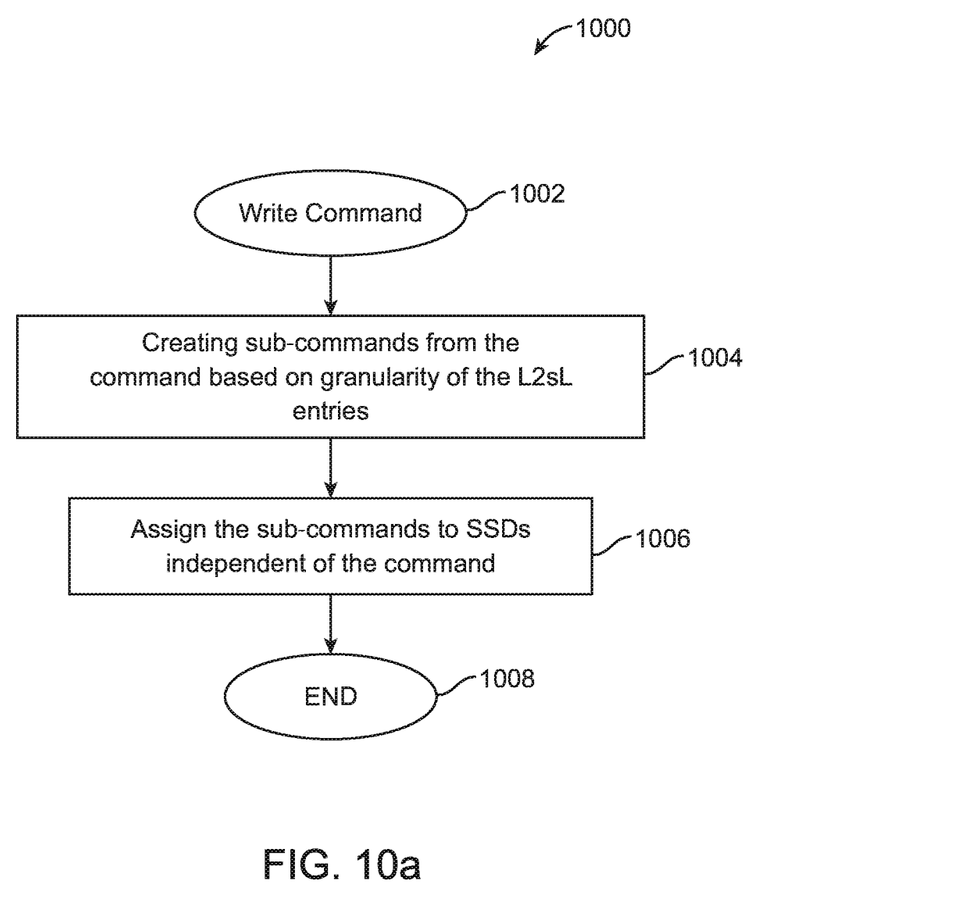
FIG. 10*a* shows a flow chart 1000 of the relevant steps performed by the CPU subsystem 14 during a write operation, in accordance with a method of the invention.

FIG. 10a shows a flow chart 1000 of the relevant steps performed by the CPU subsystem 14 during a write operation, in accordance with a method of the invention. A write command is received at step 1002. Next, at step 1004, the command is divided into one or more sub-commands based on the granularity of the SLBA table entries. Next, at step 1006, the sub-commands are assigned to SSDs independently of the received command thereby causing striping of the command across the SSDs.

Figure 10B:
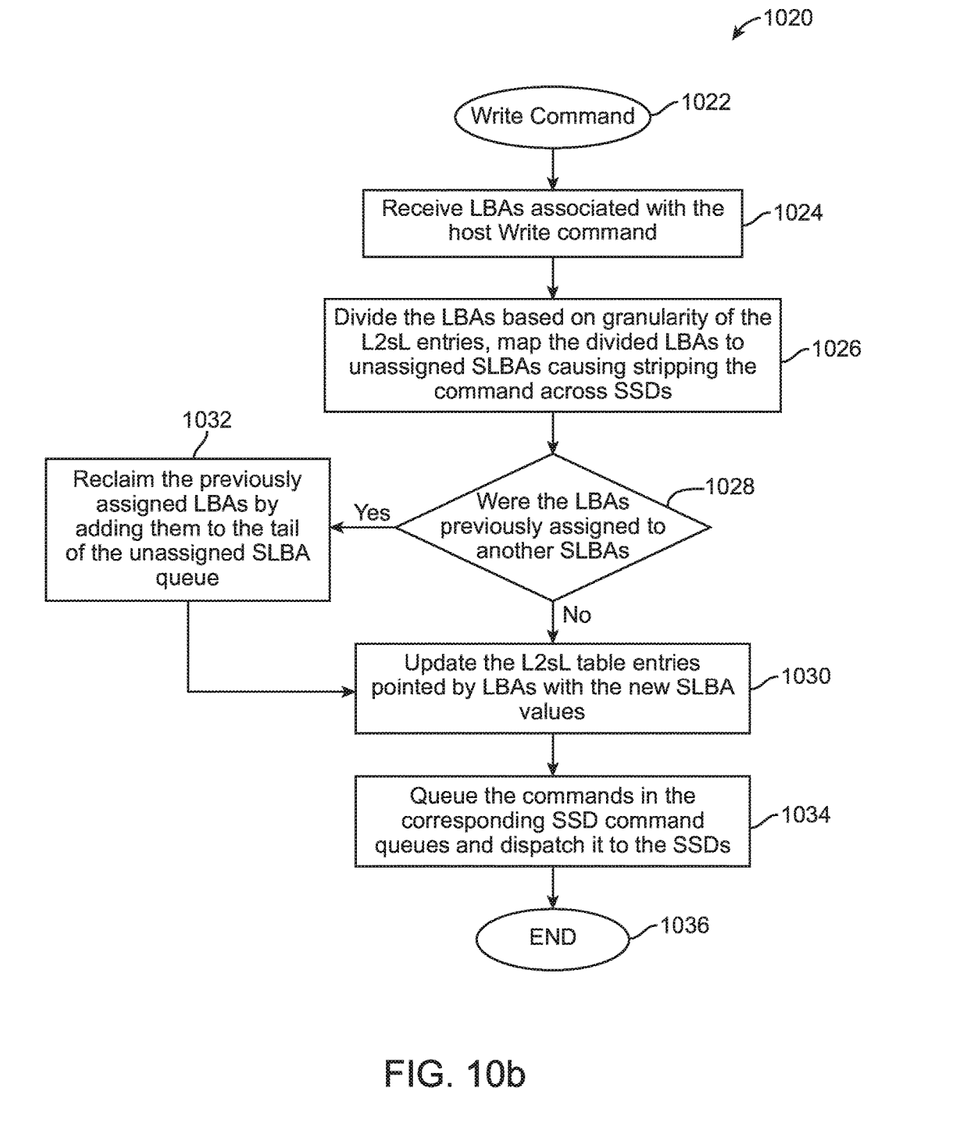
FIG. 10*b* shows a more detailed flow chart 1020 of the relevant steps performed by the CPU subsystem 14 during a write operation, in accordance with a method of the invention.

FIG. 10b shows a more detailed flow chart 1020 of the relevant steps performed by the CPU subsystem 14 during a write operation, in accordance with a method of the invention. A write command is received at 1022. Next, at step 1024, the host LBAs corresponding to the write command are received. Next, at step 1026, the received command is divided into one or more sub-command based on the number of sector count and granularity of the L2sL table entries, for example table 22. The divided sub-commands are mapped to unassigned SLBAs from the SSD unassigned SLBA queue causing striping of the command across SSDs.

Next, at 1028, a determination is made as to whether or not the LBAs from the host have been previously mapped or assigned to SLBAs and if so, the process continues to step 1032, if not, the process continues to step 1030. At step 1032, the previously-assigned SLBAs are reclaimed and added to the tail pointer of the corresponding pool of unassigned SLBA queues and the process continues to the step 1030. At step 1030, the L2sL table entries, pointed to or indexed by the LBAs, are updated with new SLBA values from step 1026. Lastly, at step 1034, the divided commands corresponding to the host write command are queued in the corresponding SSD command queues for execution. At 1036, the writing process ends.

Figure 11:
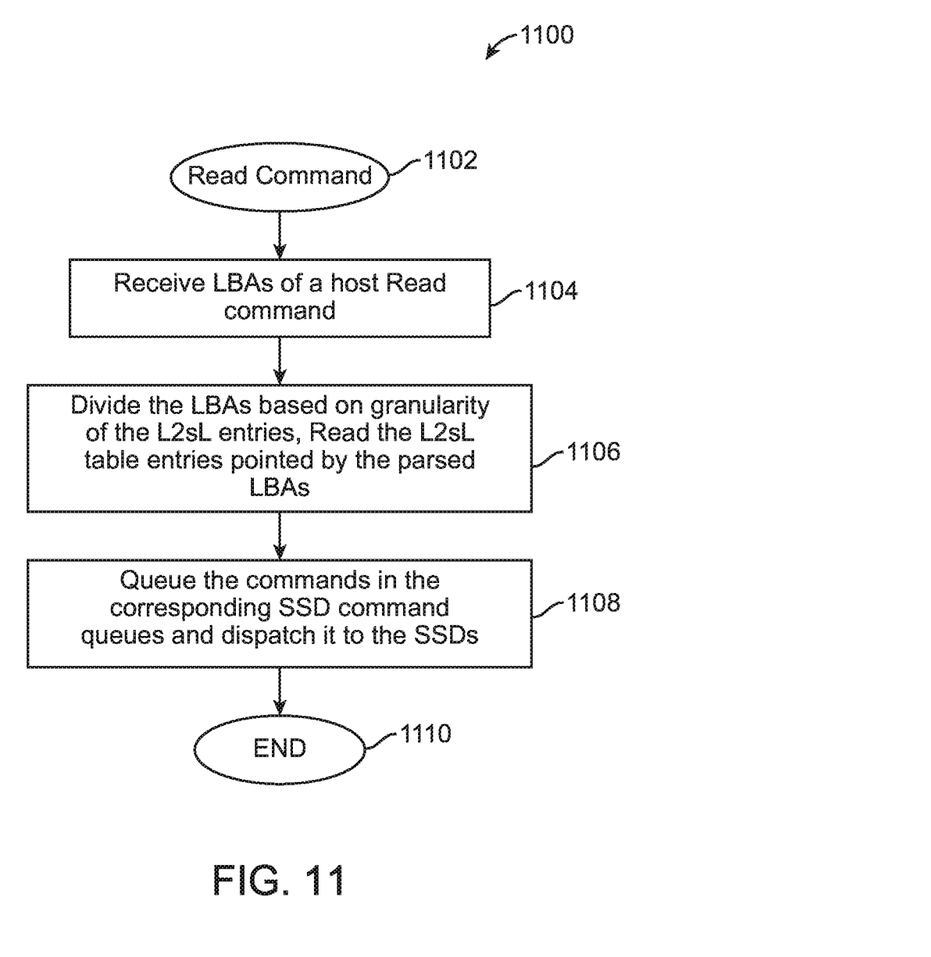
FIG. 11 shows a flow chart 1100 of the relevant steps performed by the storage processor 10 during a read operation, in accordance with a method of the invention.

FIG. 11 shows a flow chart 1100 of the relevant steps performed by the storage processor 10 or CPU subsystem 14 during a host read operation, in accordance with a method of the invention. At 1102, the read operation begins. At step 1104, host LBAs corresponding to the read command are received from the host. Next, at step 1106, the received command is divided into one or more sub-commands based on the sector count and the granularity of the L2sL table entries. Subsequently, the SLBA values in the L2sL table pointed or indexed by the host LBAs of the sub-command, are read. Next, at step 1108, the sub-commands, corresponding to the read command, are queued in corresponding SSD command queues for execution thereof. The process ends at 1110. In the event the storage processor 10 fails to find any entry in the L2sL table corresponding to the host LBAs associated with the sub command, the storage processor generates a read error to the host indicating invalid read.

In one embodiment of the invention, the indexing of the L2sL table and the granularity of the L2sL table entries are the same.

In another embodiment of the invention, the granularity of the SLBAs maintained in the SSD unassigned queues and the L2sL table entries are the same. In another embodiment, the granularity of the SLBAs and the L2sL table matches the granularity at which the SSDs maintain theirs logical to physical tables.

Although the invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claims is:

1. A storage system comprising:
a storage processor coupled to a plurality of solid state disks (SSDs) and a host, the plurality of SSDs being identified by SSD logical block addresses (SSD LBAs), the storage processor responsive to a command from the host to write to the plurality of SSDs, the command from the host accompanied by information used to identify a location within the plurality of SSDs to write data, the identified location referred to as a host LBA, the storage processor including a central processor unit (CPU) subsystem and a plurality of queues, at least some of the plurality of queues associated with a distinct SSD and maintaining unassigned SSD LBAs of a corresponding SSD, an unassigned SSD LBA of each queue forming a stripe, the CPU subsystem being operable to:
upon receiving commands to write data, defining sub-commands based on a range of host LBAs derived from the received commands and a granularity, at least one of the host LBAs of the range of host LBAs being non-sequential relative to the remaining host LBAs of the range of host LBAs,
mapping the sub-commands to unassigned SSD LBAs wherein each sub-command is mapped to a distinct SSD, the distinct SSD being part of a common stripe, a mapped SSD LBA of the stripe being different than a previously-mapped SSD LBA of the same sub-command,
repeating the mapping step for remaining SSD LBAs of the stripe until all of the SSD LBAs of the stripe are mapped before starting mapping SSD LBAs of a different stripe,
wherein host LBAs are decoupled from SSD LBAs.

* * * * *